United States Patent Office 3,120,517
Patented Feb. 4, 1964

3,120,517
METHOD OF PREPARING ALLOPREGNENES AND PRODUCTS RESULTING THEREFROM
Victor E. Origoni, Emerson, and Neil E. Rigler, Ridgewood, N.J., and Joseph J. Goodman, Nanuet, N.Y., assignors to American Cyanamid Company, New York, N.Y., a corporation of Maine
No Drawing. Filed June 6, 1961, Ser. No. 115,093
7 Claims. (Cl. 260—239.55)

This invention relates to an improved process for the production of steroid compounds and to new intermediates produced therein. More particularly, it relates to an improvement in a process for the production of the compound 9α-fluoro-11β,16α,17α,21-tetrahydroxy-1-allopregnene-3,20-dione and intermediates produced in the process.

One of the more useful steroids in commercial use at the present time is 9α-fluoro-11β,16α,17α,21-tetrahydroxy-1,4-pregnadiene-3,20-dione (triamcinolone) which possesses high anti-arthritic activity with little side effects. It is, therefore, highly desirable that an economical synthesis of triamcinolone be available.

We have now found that triamcinolone can be prepared from a relatively inexpensive commercially available starting material such as 3β-acetoxy-9(11),16-allopregnadiene-20-one which is obtainable in good yield from hecogenin, a sapogenin by-product of the sisal industry. (Callow et al, Journal of the Chemical Society 4739–4743 (1956)). The over-all process starting with the above mentioned 3β-acetoxy-9(11),16-allopregnadiene-20-one involves the simultaneous 16α,17α-hydroxylation of the starting compound, carrying out well-known C ring reactions in order to introduce a 9α-fluoro and an 11β-hydroxy radical; introducing the Δ¹ bond into A ring by fermentation method and finally introducing the Δ⁴ bond rectly convertible into triamcinolone.

The new products produced by the process of the present invention can be illustrated by the following general formula:

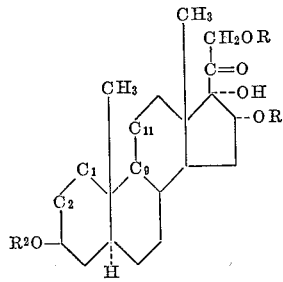

in which R, R¹ and R² are selected from the group consisting of hydrogen and lower alkanoyl radicals, —C₉—C₁₁— is a trivalent radical selected from the group consisting of

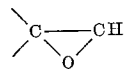

and

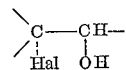

and —C₂—C₁— is selected from the group consisting of —CH₂—CH₂— and —CH=CH— radicals.

The process of the present invention consists in the introduction of the Δ¹ bond by means of a novel microbiological process employing the microorganism *Bacterium havaniensis* (ATCC No. 4001) and is shown in the following flowsheet in preparing compound VIII from compound VII. This flowsheet also describes an alternate method for preparing compound VIII which is directly convertible into triamcinolone.

FLOWSHEET

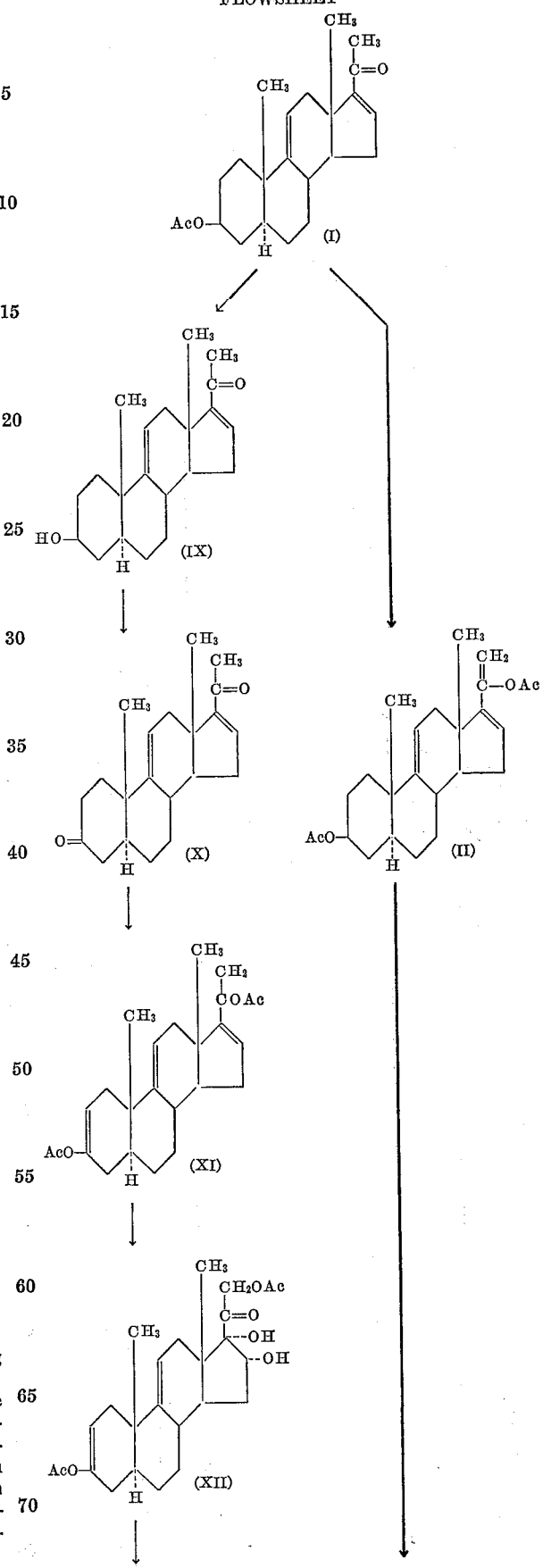

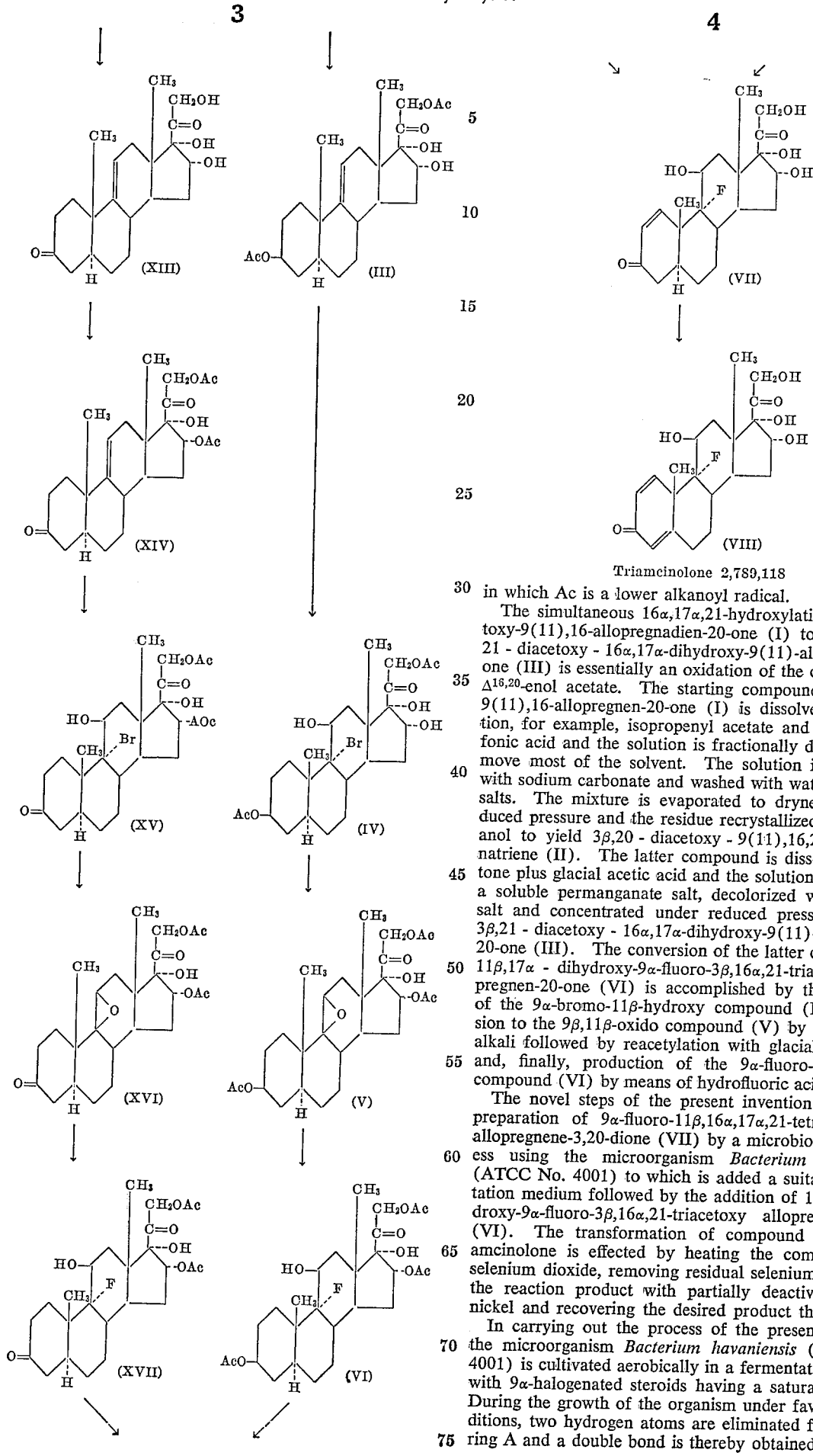

Triamcinolone 2,789,118 in which Ac is a lower alkanoyl radical.

The simultaneous 16α,17α,21-hydroxylation of 3β-acetoxy-9(11),16-allopregnadien-20-one (I) to produce 3β, 21 - diacetoxy - 16α,17α-dihydroxy-9(11)-allopregnen-20-one (III) is essentially an oxidation of the corresponding Δ$^{16,20}$-enol acetate. The starting compound 3β-acetoxy-9(11),16-allopregnen-20-one (I) is dissolved in a solution, for example, isopropenyl acetate and p-toluenesulfonic acid and the solution is fractionally distilled to remove most of the solvent. The solution is neutralized with sodium carbonate and washed with water to remove salts. The mixture is evaporated to dryness under reduced pressure and the residue recrystallized from methanol to yield 3β,20 - diacetoxy - 9(11),16,20 - allopregnatriene (II). The latter compound is dissolved in acetone plus glacial acetic acid and the solution treated with a soluble permanganate salt, decolorized with a sulfite salt and concentrated under reduced pressure to yield 3β,21 - diacetoxy - 16α,17α-dihydroxy-9(11)-allopregnen-20-one (III). The conversion of the latter compound to 11β,17α - dihydroxy-9α-fluoro-3β,16α,21-triacetoxy allopregnen-20-one (VI) is accomplished by the formation of the 9α-bromo-11β-hydroxy compound (IV), conversion to the 9β,11β-oxido compound (V) by the action of alkali followed by reacetylation with glacial acetic acid and, finally, production of the 9α-fluoro-11β-hydroxy compound (VI) by means of hydrofluoric acid.

The novel steps of the present invention involve the preparation of 9α-fluoro-11β,16α,17α,21-tetrahydroxy-1-allopregnene-3,20-dione (VII) by a microbiological process using the microorganism Bacterium havaniensis (ATCC No. 4001) to which is added a suitable fermentation medium followed by the addition of 11β,17α-dihydroxy-9α-fluoro-3β,16α,21-triacetoxy allopregnen-20-one (VI). The transformation of compound VII to triamcinolone is effected by heating the compound with selenium dioxide, removing residual selenium, contacting the reaction product with partially deactivated Raney nickel and recovering the desired product therefrom.

In carrying out the process of the present invention, the microorganism Bacterium havaniensis (ATCC No. 4001) is cultivated aerobically in a fermentation medium with 9α-halogenated steroids having a saturated A ring. During the growth of the organism under favorable conditions, two hydrogen atoms are eliminated from steroid ring A and a double bond is thereby obtained in the 1,2- position. The exact mechanism of this dehydrogenation is obscure, but it is considered to be the result of enzymes produced by the microorganism in the process of growth. A suitable nutrient medium contains a soluble source of carbon, nitrogen, and mineral elements. Sources of carbon include sugars, such as glucose, sucrose, maltose, dextrose, xylose, galactose, etc.; also alcohols such as glycerol or mannitol; corn starch, etc., organic acids such as citric acid, maleic acid and acetic acid and various natural products containing carbohydrates such as corn steep liquor, soybean meal, cottonseed meal and many other available materials which have been used heretofore as a source of carbon in fermentation processes. Usually a variety of the above can be employed in the medium with good effect.

Suitable sources of nitrogen include some of the above mentioned materials such as corn steep liquor, soybean meal, cottonseed meal and the like and various other substances such as beef extract, casein, yeast, enzymatically-digested proteins and degradation products including peptones, amino acids and many other available proteinaceous materials which have been found suitable in supporting the growth of microorganisms. Inorganic sources of nitrogen including urea, ammonium salts, nitrates and the like may be used in the medium as a source of assimilable nitrogen to provide a favorable growth medium for the organism. The mineral requirements of fermentation are usually supplied in the crude materials which are often used as sources of carbon and nitrogen or which occur in water used in the process.

The growth of *Bacterium havaniensis* takes place under aerobic conditions. Aeration in flasks, for example, can be achieved by agitation on reciprocating or rotary shakers or by forcing sterile air through the fermentation mixture in bottles or tanks. Agitation in the bottles or fermenter tanks is provided by mechanical impellers. It is preferable to carry out the process of the present invention at temperatures from about 20° C. to about 37° C. In order to prepare inoculum for the microbiological conversion of the present invention, the microorganism *Bacterium havaniensis* (ATCC No. 4001) is grown as a streak on an agar slant consisting of Difco yeast extract, 3 grams/liter; Difco beef extract, 1.5 grams/liter; Difco peptone, 6.0 grams/liter; Cerelose (dextrose) 1.0 gram/liter and agar, 20 grams/liter. One loopful of inoculum is transferred to 50 ml. of sterile inoculum medium contained in a 250 ml. flask. This inoculum medium consists of Edamine (an enzymatic digest of lactalbumin manufactured by Sheffield), 10 grams/liter; Cerelose (dextrose), 10 grams/liter; corn steep liquor, 2.5 grams/liter. The pH is adjusted, before cooking, to 6.5. The mixture is sterilized for 15 minutes at a temperature of 120° C. (i.e. 15 pounds per square inch steam pressure), then cooled to room temperature (25°±5° C.) prior to inoculation.

The inoculated medium is transferred to a rotary shaker operating at 185 r.p.m. in a room at 25°±5° C. and incubated for 24 hours. This inoculum is used to seed larger batches of sterile fermentation medium in flasks or bottles. Such flask or bottle cultures, after incubation, may be used to inoculate larger batches of medium in fermenter tanks. In place of the inoculum broth described above, other media can be used as inoculum and fermentation media, although the usual practice is to utilize the medium described above for inoculum preparation and fermentation purposes.

The 9α-halogenated steroids which have a saturated A ring and which can be used in the process of the present invention can be in the form of the acetate or other acylate or in the form of the free alcohol. The substrate steroids include the following: 3β,16α,21-triacetoxy-9α-fluoro-11β, 17α-dihydroxy-allopregnan-20-one; 3β,16α,21-triacetoxy-9α-chloro-11β,17α-dihydroxy-allopregnan-20-one; 9α-fluoro-3β,11β,16α,17α,21 - pentahydroxy-allopregnan-20-one; 3β - acetoxy-9α-fluoro-11β,16α,17α,21-tetrahydroxy-allopregnan - 20-one; 3β,21-diacetoxy-9α-fluoro-11β,16α,17α-trihydroxy-allopregnan-20-one; 3β-acetoxy-9α-chloro-11β, 16α,17α,21 - tetrahydroxy-allopregnan-20-one; 16α,21-diacetoxy - 9α-fluoro-11β,17α-dihydroxy-allopregnane-3,20-dione and 9α-fluoro-11β,16α,17α,21-tetrahydroxy-allopregnane-3,20-dione.

These substrates are generally added to the fermentation medium in the form of solutions or of suspensions of finely-divided material. A preferred method is to dissolve the steroid in a water-miscible solvent such as N,N-dimethylformamide and to add it to the fermentation medium at the desired stage in the process. Although the steroid may precipitate from solution when so added, it is dispersed throughout the medium as a fine suspension and is readily available to the organism for transformation. The amount of steroid added to the fermentation medium may vary considerably but it is generally on the order of 0.1 to 1.0 gram per liter of medium.

During the fermentation process which results in steroid substrate transformation, it may be desirable to add antifoaming agents, such as glyceride oils, silicones and the like. These materials are added from time to time and in the amounts needed.

In the preferred process of the present invention, 50 ml. volumes of a fermentation medium are placed in 250 ml. Erlenmeyer flasks and inoculated with 2% by volume of a 24 hour vegetative inoculum and incubated for 24 hours at 25° C. on a rotary shaker operating at 185 r.p.m. At the termination of this 24 hour period, there is added, under sterile conditions, a 9α-halogenated steroid having a saturated A ring and dissolved in a suitable solvent (N,N-dimethylformamide) in such a manner that the solvent volume is 1% of the fermentation medium volume and the final concentration of steroid added to the medium amounts to 250 micrograms per milliliter. The fermentation is continued at 25° C. for an additional period of time to enable maximum conversion to the $\Delta^1$ form to occur. This period of time may vary from 1 to 72 hours, or longer.

At the conclusion of the fermentation process, the desired $\Delta^1$ steroid of the 9α-halogenated series is recovered from the fermentation medium by simple solvent extraction; using a suitable water-immiscible solvent such as chlorinated lower hydrocarbons, alcohols, esters, ketones etc. Further purification and separation of steroid products from extracts may be accomplished by methods well-understood by those skilled in the art. Separation and purification of steroid mixtures often require the use of chromatography.

The steroids present in the extracted fermentation mash described above, are identified by paper strip chromatography. Two solvent systems are used. System I consists of 2 volumes of benzene, 1 volume of ethanol and 2 volumes of distilled water prepared by shaking the mixed liquids in a separatory funnel and then allowing the two layers to separate. A portion of the lower (stationary) phase is spread as a layer on the floor of a large glass cylinder. The upper layer is the mobile phase and both are placed in a dish on the floor of the large glass cylinder and used to fill the trough shaped well within the cylinder. System II consists of 2 volumes of benzene, 2 volumes of distilled water and 1 volume of acetone. System II is prepared and utilized in the same manner as System I.

Any desired standard steroid solution is prepared by dissolving 10 mgm. of the steroid in 10 ml. of ethyl acetate. At least one standard steroid solution is chromatographed in company with an unknown. Exactly 0.025 ml. of the standard steroid test solution and a similar volume of one or more of the unknown solutions or extracts are applied as separate spots at the starting line, four inches from the upper end of separate Whatman No. 1 paper chromatograph strips, which are folded over the edge of the trough and equilibrated for 2 hours. The mobile solvent (of solution A or solution B, as desired)

is then added to the trough and the hanging strips developed for 2 to 4 hours at about 27°±2° C. After proper development of the paper strips, they are removed from the apparatus, air dried, and examined under ultraviolet light. The strips are then sprayed with a solution consisting of 4 grams of isonicotinic acid hydrazide, 1 liter of methanol and 5 ml. of concentrated hydrochloric acid, which develops color at the spots where the steroids are present. Color-developed strips are lined up with at least one "standard" strip and compared. The different steroids can then be identified by their positions on the strips.

The specific examples which follow illustrate in detail the process for the production of the compound 9α-fluoro-11β,16α,17α,21-tetrahydroxy-1,4-pregnadiene-3,20 - dione and particularly the dehydrogenation of 9α-fluoro steroids having a saturated A ring by means of the microorganism *Bacterium havaniensis*.

EXAMPLE 1

*Preparation of 3β,16α,21-Triacetoxy-9α-Fluoro-11β,17α-Dihydroxy Allopregnan-20-One*

A 5.00 gram quantity of 3β-acetoxy-9(11),16-allopregnadien-20-one (I) [J. Chem. Soc. 4739–3743 (1956)], is dissolved in 400 ml. of isopropenyl acetate containing 0.60 gram of p-toluenesulfonic acid. The solvent is fractionally distilled for 8 hours through a Vigreux column at 97° C. Approximately 60 ml. of isopropenyl acetate is removed from the column over the 8 hour period and two 20 ml. volumes of isopropenyl acetate added at different times as partial replacement. The reaction is then neutralized with 5.0 grams of sodium bicarbonate. The solvent is evaporated to dryness under reduced pressure at 20° C., then the residue is recrystallized from a methanol-water solution. The 3β,20-diacetoxy-9(11),16,20-allopregnatriene (II) thus formed has the following characteristics: $[\alpha]_D^{25}$ +69.0° (1% $CHCl_3$);

$\epsilon_{1cm.}^{1\%}$ 341.0 at 238 mμ; $\lambda_{max.}^{KBr}$ 5.66, 5.78, 6.09, 6.32, 7.96, 8.32, 9.68μ

A 4.50 gram portion of the 3β,20-diacetoxy-9(11),16,20-allopregnatriene (II) above is dissolved at 0° C. in a solution of 225 ml. of acetone containing 0.9 ml. of glacial acetic acid and the solution maintained at 0° C. A 3.68 gram quantity (2.1 molar equivalents) of potassium permanganate is dissolved in 150 ml. of acetone-water (85:15 by volume), then added to the steroid solution over a 20 minute period and the mixture is allowed to react for an additional 30 minutes at 0° C. to 5° C. (approximately 2 equivalents are decolorized within 15 minutes after mixing). A solution of 2.25 grams of sodium bisulfite in 54 ml. of water is added to decolorize excess permanganate. An additional 36 ml. of water is then added, the solution is concentrated under reduced pressure at approximately 10° C. to a volume of approximately 75 ml., aged at 0° C. for 2 hours and the crystallized product is collected by filtration, washed with a 1:9 acetone-water mixture followed by a water wash and dried under reduced pressure at 40° C. The product, 3β,21-diacetoxy-16α,17α-dihydroxy - 9(11) - allopregnen - 20-one (III) has the following characteristics: melting point 186–189° C.; $[\alpha]_D^{25}$=+71.8° (1%, $CHCl_3$);

$\lambda_{max.}^{KBr}$ 2.88, 2.76, 7.10, 7.96, 9.70μ

This product can be deacetylated, if desired, to produce 3β,16α,17α,21-tetrahydroxy-9(11)-allopregnan-20-one.

A 15 gram quantity of the compound 3β,21-diacetoxy-16α,17α-dihydroxy-9(11)-allopregnan-20-one (III) prepared as described above is dissolved in 4500 ml. of dioxane plus 600 ml. of water. To this solution is added 15 grams of N-bromacetamide, followed immediately by 180 ml. of 3% aqueous perchloric acid and the mixture is reacted for 25 minutes in the dark at room temperature (25°±5° C.). Excess N-bromacetamide is destroyed by the addition of aqueous sodium meta-bisulfite to remove the yellow color. Following the addition of 1200 ml. of 2 N sodium hydroxide solution plus 2250 ml. of water, the mixture is allowed to react for 20 minutes, then acidified with 210 ml. of glacial acetic acid. The resulting colorless solution is concentrated under vacuum to approximately 6000 ml. The concentrated solution is extracted twice with separate 1000 ml. volumes of methylene chloride. The extract is washed twice with 500 ml. volumes of water, then dried over magnesium sulfate and subsequently evaporated to dryness. Reacetylation in pyridine with acetic anhydride produced the product 3β,16α,21-triacetoxy-17α-hydroxy-9β,11β-oxido-allopregnan-20-one (V) which has the following characteristics: melting point 174–176° C.; $[\alpha]_D^{25}$=−8.7° (1% $CHCl_3$);

$\lambda_{max.}^{KBr}$ 2.85, 5.74, 8.00, 8.98, 9.40, 9.70μ

A 1.4 gram (2.86 millimoles) quantity of 3β,16α,21-triacetoxy-17α-hydroxy-9β,11β-oxido-allopregnan - 20 - one (V) is dissolved in 8.8 ml. of methylene chloride and the resulting solution (Solution A) is cooled to −60° C. Another solution (Solution B) is made by mixing 3.61 ml. (0.045 mole) of tetrahydrofurane with 1.58 ml. of methylene chloride, cooling to −60° C., then combining this with 1.86 ml. (0.098 mole) of cooled (−60° C.) hydrofluoric acid. Solution A is poured into Solution B and the mixture is allowed to react at 0° C. for 3 hours. The reaction is quenched with 110 ml. of a saturated aqueous solution of sodium bicarbonate. The reaction solution is extracted 3 times with 25 ml. portions of methylene chloride. The methylene chloride extracts are combined, partially dried over magnesium sulfate and evaporated to dryness under reduced pressure yielding 1.24 grams of 3β,16α,21-triacetoxy-9α-fluoro-11β,17α-dihydroxy-allopregnan-20-one (VI). The product is chromatographed through diatomaceous earth filter aid with a solvent system consisting of water:dioxane:cyclohexane (1:5:4) and 340 milligrams of pure material obtained having the following characteristics: melting point 236–237° C.; $[\alpha]_D^{25}$=+101° C. (1% $CHCl_3$);

$\lambda_{max.}^{KBr}$ 2.85, 5.75, 8.00, 9.42, 9.75μ

EXAMPLE 2

*Preparation of 9α-Fluoro-11β,16α,17α,21-Tetrahydroxy-1-Allopregnene-3,20-Dione (VII)*

One loopful of an agar slant culture of *Bacterium havaniensis* (ATCC No. 4001) is placed in 50 ml. of sterile inoculum medium (previously described) contained in a 250 ml. Erlenmeyer flask. The flask is incubated for 24 hours at 25° C. on a 185 r.p.m. rotary shaker. The vegetative inoculum thus produced is used, on a 2% by volume basis, to inoculate 50 ml. portions of fermentation medium (previously described) contained in 250 ml. Erlenmeyer flasks. The inoculated fermentation flasks are incubated for 24 hours at 25° C. on a 185 r.p.m. rotary shaker. At the termination of this 24 hour period, there is added to each flask, under sterile conditions, 0.5 ml. of a sterile 2.5% solution of 3β,16α,21-triacetoxy-9α-fluoro-11β,17α-dihydroxy-allopregnan-20-one (IV) in N,N-dimethylformamide. The inoculated, steroid-containing fermentation medium is incubated an additional 48 hours at 25° C. on a rotary shaker operating at 185 r.p.m. At intervals during this period, a 10 ml. sample of the fermentation mash is removed and extracted three times with 10 ml. volumes of ethyl acetate. The extracts are combined and evaporated. The residue is made up to 10 ml. with ethyl acetate and a 0.025 ml. aliquot is spotted on Whatman No. 1 chromatographic paper and subjected to descending development, utilizing System II (previously described). The paper strip chromatograms indicated the presence of gradually-increasing amounts of the desired product, 9α-fluoro-11β,16α,17α,21-tetrahydroxy-1-allopregnene-3,20-dione (VII) at $R_f=0.41$.

At the termination of the fermentation period, the fermentation harvest mashes are combined, extracted with ethyl acetate, the extracts evaporated to dryness under reduced pressure and the residue chromatographed through diatomaceous earth with a developing system consisting of water:dioxane:cyclohexane 1:5:4 to furnish the desired product, 9α-fluoro-11β,16α,17α,21-tetrahydroxy-1-allopregnene-3,20-dione. $\lambda_{max}$ ethanol 226 mμ, $R_f=0.43$ (System II).

EXAMPLE 3

*Preparation of 9α-Fluoro-11β,16α,17α,21-Tetrahydroxy-1-Allopregnene-3,20-Dione (VII)*

(I→IX)

A 10 gram quantity of 3β-acetoxy-9(11),16-allopregnadien-20-one (A) is hydrolyzed in methanol with dilute (5%) sodium hydroxide solution under a nitrogen atmosphere at room temperature (25°±5° C.) for 2 hours. The reaction mixture is worked up by neutralization and crystallization by the addition of sodium chloride solution; yielding 3β-hydroxy-9(11),16-allopregnadien-20-one (IX). Melting point 182–184° C. $[\alpha]_D$ +114.7° (CHCl$_3$);

$\epsilon_{1\ cm.}^{1\%}$ 257, 238 mμ

(IX→X)

A 9.0 gram quantity of 3β-hydroxy-9(11),16-allopregnadien-20-one (IX) is dissolved in 400 ml. of acetone. Then 9.0 ml. of a solution of chromic oxide in sulfuric acid (5.2 g. chromic acid in 4.6 ml. sulfuric acid; diluted to a total volume of 20 ml. with water) is added and the reaction allowed to proceed for 8 minutes at 20° C. The reaction is quenched with water (170 ml. needed for crystallization to occur). The mixture is aged for ½ hour and then an additional 230 ml. of water is added. The mixture is aged an additional hour at 5° C., filtration of this mixture and subsequent water wash yields 8.16 grams of 9(11),16-allopragnadiene-3,20-dione (X) which is homogeneous by paper chromatography and infrared analysis. Melting point 220–222.5° C., $[\alpha]_D$ +161.4° (CHCl$_3$);

$\epsilon_{1\ cm.}^{1\%}$ 243, 238 mμ

(X→XI)

A 7.5 gram quantity of 9(11),16-allopregnadiene-3,20-dione (X) is enol acetylated with isopropenyl acetate and p-toluenesulfonic acid as described in Example 1 to produce 6.34 grams of pure 3,20-diacetoxy-2,9(11),16,20-allopregnatetraene (XI). Infrared analysis and paper chromatographic assay showed homogeneity.

(XI→XII)

A 6.0 gram quantity of 3,20-diacetoxy-2,9(11),16,20-allopregnatetraene (XI) is dissolved in 240 ml. of acetone. The solution is cooled to 5° C. and 1.5 ml. of glacial acetic acid added. A solution of 4.91 grams of potassium permanganate in 180 ml. of 15% aqueous acetone is added slowly to the stirred solution over a 15 minute period. The reaction is allowed to proceed for an additional 30 minutes at 5° C. The excess potassium permanganate is then reduced with aqueous sodium bisulfite solution and the manganese dioxide filtered off. The addition of 100 ml. of water and concentration under reduced pressure to remove acetone, yields dihydroxy enol diacetate crystals. The mixture is aged at 0° C. for 2 hours. The crystals are collected by filtration, water washed and vacuum dried at 40° C. The yield is 4.98 grams of the desired product, 3,21-diacetoxy-16α,17α-dihydroxy-2,9(11)-allopregnadien-20-one (XII).

$\lambda_{max}^{KBr}$ 2.78, 5.76, 8.00, 8.10, 8.80, 9.40μ. PC—homogeneous.

(XII→XIII)

An 8.5 gram quantity of 3,21-diacetoxy-16α,17α-dihydroxy-2,9(11)-allopregnadien-20-one (XII) prepared as shown above, is dissolved in 500 ml. of methanol and treated for 60 minutes at 25°±5° C. under nitrogen with 35 ml. of a 10% aqueous solution of potassium carbonate. The reaction mixture is next diluted with water and the methanol removed by concentration under reduced pressure. The resulting crystals are collected by filtration, washed with water and dried under reduced pressure. The product is pure 16α,17α,21-trihydroxy-9(11)-allopregnene-3,20-dione (XIII).

(XIII→XIV)

To a solution of 7.0 grams of 16α,17α,21-trihydroxy-9(11)-allopregnene-3,20-dione (XIII) prepared as described above in 50 ml. of pyridine is added 5.0 ml. of acetic anhydride and the mixture is allowed to stand for 16 hours at room temperature (25°±5° C.). The reaction is quenched by the addition of 10 ml. of methanol and the solution concentrated to dryness under reduced pressure. The crude product residue thus obtained is recrystallized from acetone-petroleum ether to furnish crystalline 16α,21-diacetoxy-17α-hydroxy-9(11)-allopregnene-3,20-dione (XIV)

$\lambda_{max}^{KBr}$ 2.85, 5.76, 5.82, 7.94, 8.00, 8.10, 9.40, 9.70μ. PC—homogeneous.

(XIV→XVI)

To a solution of 2 grams of 16α,21-diacetoxy-17α-hydroxy-9(11)-allopregnene-3,20-dione (XIV) in a mixture of 400 ml. of dioxane and 80 ml. of water, is added a solution of 2 grams of N-bromoacetamide in 24 ml. of 3% aqueous perchloric acid and the reaction allowed to proceed for 25 minutes at room temperature (25°±5° C.) in the absence of light. At the termination of this reaction period, sufficient aqueous sodium metabisulfite solution to decolorize the reaction mixture is added and the resulting solution cooled to 0° C. To the cooled solution is added 180 ml. of 1.3 N aqueous sodium hydroxide and the reaction is allowed to proceed for 20 minutes at 0° C. After quenching with 6 ml. of glacial acetic acid, the reaction solution is concentrated under reduced pressure to approximately half of its original volume. The concentrate is extracted with three portions of dichloromethane. The combined extracts are washed with saturated aqueous sodium bicarbonate and saturated sodium chloride solution, dried over magnesium sulfate and concentrated to dryness under reduced pressure. A solution of the resulting crude product in ethyl acetate is filtered through silica gel and the filtrate evaporated to dryness under reduced pressure, resulting in crystalline 16α,21-diacetoxy-17α-hydroxy-9β,11β-oxido-allopregnane-3,20-dione (XVI).

(XVI→XVII)

A solution of 1.45 ml. of hydrogen fluoride in a mixture of 2.9 ml. of tetrahydrofuran and 1.25 ml. of dichloromethane is cooled to −60° C. A solution of 1.10 grams of 16α,21-diacetoxy-17α-hydroxy-9β,11β-oxido-allopregnane-3,20-dione (XVI) in 7 ml. of dichloromethane at −60° is added to the first solution and the temperature of the mixture is allowed to raise to 0° C. and to remain there for 3 hours. The reaction is quenched by the addition of 85 ml. of saturated aqueous sodium bicarbonate and the mixture extracted with dichloromethane. The extract is washed with saturated sodium chloride solution, dried over magnesium sulfate and concentrated to dryness under reduced pressure. Reacetylation of the residue with acetic anhydride:pyridine for 16 hours at room temperature (25°±5° C.) produces crude 16α,21-diacetoxy-9α-fluoro-11β,17α-dihydroxy-allopregnane-3,20-dione (XVII). Chromatography of the crude product on a diatomaceous earth column and development with a solvent system consisting of water:methanol:dioxane:cyclohexane 1:2:2:6 and evaporation of the proper fractions results in a pure product.

EXAMPLE 4

*Preparation of 9α-Fluoro-11β,16α,17α,21-Tetrahydroxy-1-Allopregnene-3,20-Dione*

Following the procedure of Example 2 above, for the preparation of inoculum and fermentation medium and utilizing the same fermentation conditions, a total of 0.63 gram of 16α,21-diacetoxy-9α-fluoro-11β,17α-dihydroxy-allopregnane-3,20-dione (XVII) is subjected to the action of *Bacterium havaniensis* (ATCC No. 4001) for a period of 24 hours. The harvest mash is extracted three times with saturated sodium chloride solution and concentrated to dryness under reduced pressure. The resulting residue is chromatographed on diatomaceous earth, utilizing the system water:dioxane:cyclohexane 1:5:4. The proper fractions are evaporated to dryness and this residue crystallizes from aqueous methanol to furnish 9α-fluoro-11β,16α,17α,21-tetrahydroxy-1-allopregnene-3,20-dione (VII) having the same characteristics as the sample prepared in Example 2.

$\lambda_{max.}$ ethanol 226 m$\mu$, $\epsilon_{1\ cm.}^{1\%}$ 260

We claim:

1. A compound of the formula:

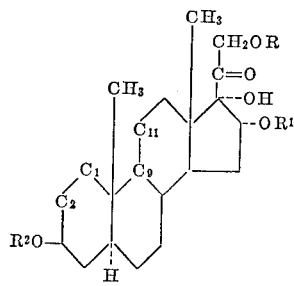

in which R, $R^1$ and $R^2$ are selected from the group consisting of hydrogen and lower alkanoyl radicals, —$C_9$—$C_{11}$— is the trivalent radical $$\diagdown\!\!\!\underset{\mathrm{Hal}}{\mathrm{C}}\!\!-\!\!\underset{\mathrm{OH}}{\mathrm{CH}}\!\!-\!\!\diagup$$

and —$C_2$—$C_1$— is selected from the group consisting of —$CH_2$—$CH_2$— and —CH=CH—.

2. The compound 3β,16α,21-triacetoxy-17α-hydroxy-9β,11β-oxido-allopregnan-20-one.

3. The compound 16α,21-diacetoxy-17α-hydroxy-9β,11β-oxido-allopregnan-3,20-dione.

4. The compound 16α,21-diacetoxy-9α-fluoro-11β,17α-dihydroxy-allopregnane-3,20-dione.

5. The compound 3β,16α,21-triacetoxy-9α-fluoro-11β,17α-dihydroxy allopregnan-20-one.

6. The compound 9α-fluoro-11β,16α,17α,21-tetrahydroxy-1-allopregnene-3,20-dione.

7. A compound of the formula:

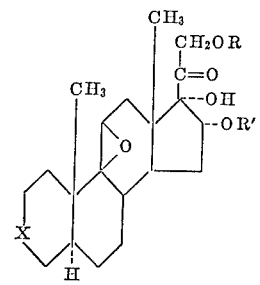

in which X is selected from the group consisting of O=C< and lower alkanoyl-O—C< and R and R' are lower ankanoyl.

References Cited in the file of this patent

UNITED STATES PATENTS

| | | |
|---|---|---|
| 2,864,834 | Mendelsohn et al. | Dec. 16, 1958 |
| 2,880,205 | Campbell et al. | Mar. 31, 1959 |
| 2,900,398 | Wettstein et al. | Aug. 18, 1959 |
| 2,992,973 | Terumichi | July 18, 1961 |

UNITED STATES PATENT OFFICE
CERTIFICATE OF CORRECTION

Patent No. 3,120,517                                                February 4, 1964

Victor E. Origoni et al.

It is hereby certified that error appears in the above numbered patent requiring correction and that the said Letters Patent should read as corrected below.

Column 1, line 37, for "rectly convertible into triamcinolone." read -- into the A ring to produce triamcinolone. --.

Signed and sealed this 23rd day of June 1964.

(SEAL)
Attest:

ERNEST W. SWIDER                                         EDWARD J. BRENNER
Attesting Officer                                             Commissioner of Patents